US010148725B2

(12) United States Patent
Lee

(10) Patent No.: US 10,148,725 B2
(45) Date of Patent: Dec. 4, 2018

(54) APPARATUS AND COMPUTER-READABLE RECORDING MEDIUM HAVING PROGRAM RECORDED THEREIN FOR PROVIDING LOW-LATENCY REAL-TIME BROADCAST CONTENT

(71) Applicant: SK Telecom Co., Ltd., Seoul (KR)

(72) Inventor: Jongmin Lee, Seoul (KR)

(73) Assignee: SK TELECOM CO., LTD., Seoul (KR)

(*) Notice: Subject to any disclaimer, the term of this patent is extended or adjusted under 35 U.S.C. 154(b) by 0 days.

(21) Appl. No.: 15/622,539

(22) Filed: Jun. 14, 2017

(65) Prior Publication Data
US 2017/0324797 A1 Nov. 9, 2017

Related U.S. Application Data

(63) Continuation of application No. PCT/KR2016/001460, filed on Feb. 13, 2016.

(30) Foreign Application Priority Data

Feb. 13, 2015 (KR) .................. 10-2015-0022327

(51) Int. Cl.
H04N 7/173 (2011.01)
H04L 29/06 (2006.01)
(Continued)

(52) U.S. Cl.
CPC ........ H04L 65/608 (2013.01); H04L 65/4084 (2013.01); H04L 65/4092 (2013.01);
(Continued)

(58) Field of Classification Search
CPC ........... H04N 21/2187; H04N 21/2365; H04N 21/47217; H04L 65/608; H04L 65/607
See application file for complete search history.

(56) References Cited

U.S. PATENT DOCUMENTS

2013/0173826 A1* 7/2013 Kim .................. H04L 65/10
709/248
2013/0297817 A1* 11/2013 Bae .................. H04L 65/608
709/231
(Continued)

FOREIGN PATENT DOCUMENTS

KR 1020130112576 A 10/2013
KR 1020140048917 A 4/2014
(Continued)

OTHER PUBLICATIONS

International Search Report for PCT/KR2016/001460 dated Jun. 29, 2016.

Primary Examiner — John R Schnurr
(74) Attorney, Agent, or Firm — Hauptman Ham, LLP

(57) ABSTRACT

The disclosure relates to an apparatus for providing low-latency real-time broadcast content in an MMT-based streaming service and a computer-readable recording medium having a related program recorded therein. According to the disclosure, when a streaming request event for an arbitrary channel occurs, the apparatus determines whether the streaming request event satisfies an event condition for switching to a low-latency real-time broadcast mode. Depending on a determination results, the apparatus transmits a streaming request to a first or second streaming server for providing a streaming service based on a first or second media transmission technique. Then the apparatus receives and decodes a first or second streaming data packet of real-time broadcast content from the first or second streaming server and plays the decoded first or second streaming data packet.

6 Claims, 7 Drawing Sheets

(51) Int. Cl.
   *H04N 21/236*    (2011.01)
   *H04N 21/2365*   (2011.01)
   *H04N 21/4335*   (2011.01)
   *H04N 21/2187*   (2011.01)
   *H04N 21/472*    (2011.01)

(52) U.S. Cl.
   CPC .......... *H04L 65/602* (2013.01); *H04L 65/607* (2013.01); *H04L 65/80* (2013.01); *H04N 21/2187* (2013.01); *H04N 21/236* (2013.01); *H04N 21/2365* (2013.01); *H04N 21/4335* (2013.01); *H04N 21/47217* (2013.01)

(56)           References Cited

U.S. PATENT DOCUMENTS

2014/0354890 A1* 12/2014 Eyer ................. H04N 5/50
                                              348/732
2017/0347134 A1* 11/2017 Bae ................ H04N 21/2381

FOREIGN PATENT DOCUMENTS

KR         10-1397332 B1    5/2014
KR        1020140099778 A   8/2014
WO          2012099359 A2   7/2012

* cited by examiner

APPARATUS AND COMPUTER-READABLE RECORDING MEDIUM HAVING PROGRAM RECORDED THEREIN FOR PROVIDING LOW-LATENCY REAL-TIME BROADCAST CONTENT

CROSS-REFERENCE TO RELATED APPLICATIONS

The present application is a continuation of International Patent Application No. PCT/KR2016/001460, filed on Feb. 13, 2016, which is based upon and claims the benefit of priority to Korean Patent Application No. 10-2015-0022327, filed on Feb. 13, 2015. The disclosures of the above-listed applications are hereby incorporated by reference herein in their entirety.

TECHNICAL FIELD

The disclosure relates to streaming-type content providing technology.

BACKGROUND

Moving picture experts group (MPEG)-2 transport stream (TS) is a communication protocol for transmitting multimedia-related data including audio, video, data, and the like through a network. MPEG-2 TS is used for transmission of media data in terrestrial/satellite digital broadcasting, digital multimedia broadcasting (DMB), internet protocol television (IPTV), and the like, and also used for storing media in a digital video camera or a Blu-ray device.

However, as the broadcasting network and the communication network gradually converge and become advanced, new generation contents such as ultra high definition (UHD) video contents and 3-dimensional (3D) video contents and new services such as N-screen service are emerging in these days. As a result, new and various requirements arise.

Therefore, as the first part of MPEG-H (High Efficiency Coding and Media Delivery in Heterogeneous Environments) standard to provide various services such as digital broadcasting in various kinds of broadband communication networks, MPEG media transport (MMT) technology is being developed.

The MMT technology aims at providing functions of efficient multimedia data transmission and playback in various network environments that are being advanced. The MMT technology mainly includes a media processing unit (MPU) function area, a signaling function area, a delivery function area, and a presentation information area.

Although the MMT technology has various advantages over the existing MPEG-TS technology, the MPEG-TS technology has been used in various fields for about 20 years, and it is therefore impossible and inefficient to immediately replace all the existing MPEG-TS-based legacy systems with MMT-based systems.

Accordingly, there is a need for an efficient operation of the existing MPEG-TS-based legacy system and the MMT-based system in an environment where both systems coexist.

SUMMARY

The disclosure proposed to solve the above demands is to implement an apparatus for providing low-latency real-time broadcast content and also implement a computer-readable recording medium having a program recorded therein for providing low-latency real-time broadcast content in order to allow an efficient operation with legacy systems by performing an MMT-based streaming service of real-time broadcast contents in response to a user request or a request for switching to a specific channel.

In order to accomplish the above objects, an apparatus for providing low-latency real-time broadcast content according to the disclosure includes a first media receiving module configured to receive and decode a first streaming data packet of real-time broadcast content from a first streaming server for providing a streaming service based on a first media transmission technique; a second media receiving module configured to receive and decode a second streaming data packet of the real-time broadcast content from a second streaming server for providing the streaming service based on a second media transmission technique which is different from the first media transmission technique; and a playback module configured to provide a user interface for playback of the real-time broadcast content, to determine whether a streaming request event satisfies an event condition for switching to a low-latency real-time broadcast mode when the streaming request event for an arbitrary channel occurs through the user interface, to instruct a streaming request to the first or second media receiving module depending on a determination result, and to play the decoded first or second streaming data packet received from the first or second media receiving module.

Additionally, in order to accomplish the above objects, a computer-readable recording medium according to the disclosure has a program recorded therein for providing low-latency real-time broadcast content, the program including steps of determining whether a streaming request event satisfies an event condition for switching to a low-latency real-time broadcast mode when the streaming request event for an arbitrary channel occurs; if the event condition is not satisfied, transmitting a streaming request to a first streaming server for providing a streaming service based on a first media transmission technique and then receiving and decoding a first streaming data packet of real-time broadcast content from the first streaming server; if the event condition is satisfied, transmitting the streaming request to a second streaming server for providing the streaming service based on a second media transmission technique different from the first media transmission technique and then receiving and decoding a second streaming data packet of the real-time broadcast content from the second streaming server; and playing the decoded first or second streaming data packet.

The technique to provide low-latency real-time broadcast content according to the disclosure can be applied to a content transmission system for transmitting multimedia data of real-time broadcast content in a streaming manner and playing the data in real time, especially to a user terminal that receives streaming.

In particular, according to the disclosure, in an environment where an HTTP live streaming (HLS) system based on MPEG-TS technology and a streaming system based on MMT technology coexist, it is possible to selectively provide low-latency real-time broadcast content by switching from an HLS-type streaming service to an MMT-based streaming service in response to a user request or a request for switching to a specific channel.

As a result, the disclosure can improve a service quality provided to users while efficiently operating both a pre-constructed legacy system and an MMT-based new system.

DETAILED DESCRIPTION

Figure 1:
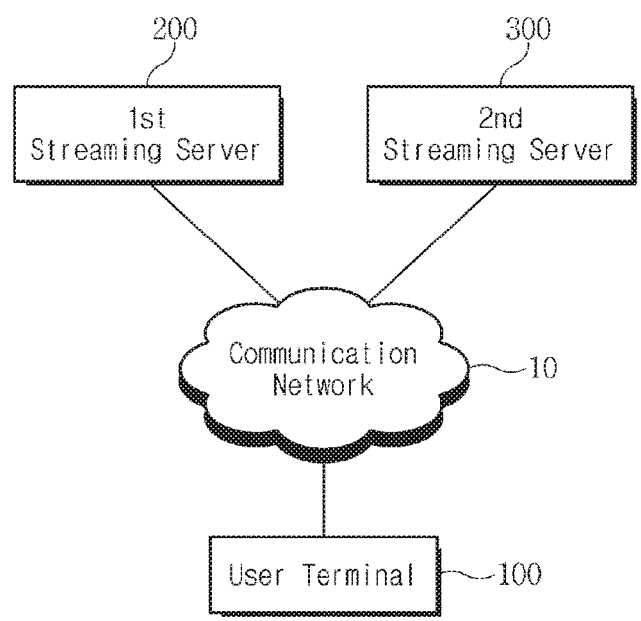
FIG. 1 is a diagram illustrating a system for providing low-latency real-time broadcast content according to a first embodiment of the disclosure.

Hereinafter, embodiments of the disclosure will be described in detail with reference to the accompanying drawings. In the following description and the accompanying drawings, well-known functions or elements may not be described or illustrated in detail to avoid obscuring the subject matter of the disclosure. The same elements may be denoted by the same reference numerals throughout the drawings.

The terms and words used herein should not be construed as limited to ordinary or dictionary definition terms, but should be construed in light of the meanings and concepts consistent with the subject matter of the disclosure on the basis of the principle that the inventor can properly define his own disclosure as the concept of the term to describe it in the best way. It is therefore to be understood that embodiments disclosed herein are merely exemplary and various equivalents or modifications thereof are possible.

Additionally, the terms including expressions "first", "second", etc. are used for merely distinguishing one element from other elements but do not limit the corresponding elements. The above expressions do not limit the sequence and/or importance of the elements.

Further, when it is stated that a certain element is "coupled to" or "connected to" another element, the element may be logically, electrically or physically coupled to or connected to another element. Namely, the element may be directly coupled or connected to another element, or a new element may exist between both elements.

Also, the terms used in describing various embodiments of the disclosure are only examples for describing a specific embodiment but do not limit such embodiments. Singular forms are intended to include plural forms unless the context clearly indicates otherwise. Unless defined differently, all terms used herein, which include technical terminologies or scientific terminologies, have the same meaning as that understood by a person skilled in the art to which the disclosure belongs. The terms "include", "comprise", and "have" as well as derivatives thereof, mean inclusion without limitation.

FIG. 1 is a diagram illustrating a system for providing low-latency real-time broadcast content according to a first embodiment of the disclosure.

Referring to FIG. 1, the system for providing low-latency real-time broadcast content according to the first embodiment of the disclosure includes a user terminal 100, a first streaming server 200, and a second streaming server 300, which are connected to each other through a communication network 10.

The communication network 10 is defined as one or more data links for transmitting electronic data between computer systems and/or modules. The communication network 10 may be formed of a combination of two or more different-type communication networks.

For example, the communication network 10 may include wired/wireless communication networks such as a 3G mobile communication network, a 4G mobile communication network, a wireless local area network (WLAN), Wi-Fi, WiBro, WiMAX, a high speed downlink packet access (HSDPA), Ethernet, a digital subscriber line (DSL) or xDSL such as ADSL or VDSL, a hybrid fiber coaxial cable (HFC), a fiber to the curb (FTTC), and a fiber to the home (FTTH).

In particular, if the communication network 10 is a mobile communication network, it may be formed of a plurality of radio access networks and a core network. Here, the radio access network which is a network for performing wireless communication with the user terminal 100 may include a plurality of base stations (BSs), also referred to as a base transceiver station (BTS), Node B, or evolved Node B (eNB), and controllers referred to as a base station controller (BSC) or a radio network controller (RNC). In addition, a digital signal processor and a radio signal processor, which are normally implemented with the base station, may be separated as a digital unit (DU) and a radio unit (RU). Then a plurality of RUs may be disposed respectively at a plurality of regions and connected to a centralized DU.

The core network which forms a mobile communication network together with the radio access networks performs a function to connect the access networks to an external network such as Internet. The core network performs circuit switching or packet switching and also manages and controls a packet flow in the mobile network. Additionally, the core network may manage mobility between frequencies, control traffic therein and in the access networks, and control interworking with other network such as Internet. The core network may include a serving gateway (SGW), a packet data network (PDN) gateway (PGW), a mobile switching center (MSC), a home location register (HLR), a mobile mobility entity (MME), a home subscriber server (HSS), and/or the like.

The user terminal 100 is configured to receive content through the communication network 10 and to play the received content. Specifically, the user terminal 100 accesses the communication network 10, connects a session for communication, sends a request for streaming of specific content to the first or second streaming server 200 or 300 through the session, receives a streaming data packet of the specific content from the first or second streaming server 200 or 300, and performs playback of the streaming data packet.

Particularly, when a streaming event occurs by a user's manipulation, the user terminal 100 interworks with the first streaming server 200 or the second streaming server 300, depending on whether the streaming event satisfies a predetermined event condition for switching to a low-latency real-time broadcast mode. Namely, the user terminal 100 according to the disclosure may operate in two modes when receiving and playing real-time broadcast content. The first mode refers to playback of multimedia data of real-time broadcast content streamed from the first streaming server 200, and the second mode refers to playback of multimedia data of real-time broadcast content streamed from the second streaming server 300. In the disclosure, the second mode may also be referred to as 'a low-latency real-time broadcast mode or a true real-time mode'. The event condition for switching to the low-latency real-time broadcast mode may be an input of a predetermined mode change button or a channel change to a predetermined specific channel.

The user terminal 100 may be implemented by any electronic device capable of transmitting and receiving various kinds of data via the network in response to a user's key manipulation. For this, the user terminal 100 may have a computing environment such as a memory for storing various kinds of programs and protocols, a microprocessor for executing and controlling the programs, and the like, and may perform the above-mentioned functions by executing a certain application program or program module based on the computing environment.

For example, the user terminal 100 may be one of a tablet PC, a laptop, a personal computer (PC), a smart phone, a personal digital assistant (PDA), a smart TV, a mobile communication terminal, and the like.

Each of the first and second streaming servers 200 and 300 is a server for streaming multimedia data, especially multimedia data of real-time broadcast content, to the user terminal 100 in response to a request of the user terminal 100. By the way, the first and second streaming servers 200 and 300 perform streaming of the multimedia data, based on different media transmission techniques.

Here, streaming is a technique of dividing a multimedia file such as music or video into a plurality of streaming data and transmitting them in sequence to allow a continuous playback of streaming data. By allowing playback together with download, streaming can reduce a user's waiting time and also provide contents in real time or live broadcast contents.

The streaming server may operate using one or more of data transport and control protocols such as a real-time transport protocol (RTP), a real-time transport control protocol (RTCP), a real time messaging protocol (RTMP), a real time streaming protocol (RTSP), an HTTP live streaming, an MPEG-TS, and an MPEG media transport (MMT), based on a transport layer protocol such as a user datagram protocol (UDP) and a transmission control protocol (TCP).

Specifically, the first streaming server 200 performs fragmentation, encapsulation and packetization for multimedia data of real-time broadcast content, based on the existing MPEG-TS and HLS technologies, and transmits streaming packets to the user terminal 100. In particular, the first streaming server 200 transmits multimedia data to the user terminal 100 in the form of transport stream (TS) of MPEG 2 divided in time units, further sending information about which files are to be played back.

On the other hand, the second streaming server 300 performs fragmentation, encapsulation and packetization for multimedia data of real-time broadcast content, based on the MMT technology proposed as the first part of MPEG-H. In particular, the second streaming server 300 constructs multimedia data into one or more media processing units (MPUs) formed of pure media data and metadata including information for decoding and playing the multimedia data, creates a streaming data packet to which a header is added through packetization of the one or more MPUs, and transmits the packet to the user terminal 100. In case of this MMT-based streaming transmission, metadata is included for each MPU, and thus each MPU can be independently decoded and played back.

Figure 2:
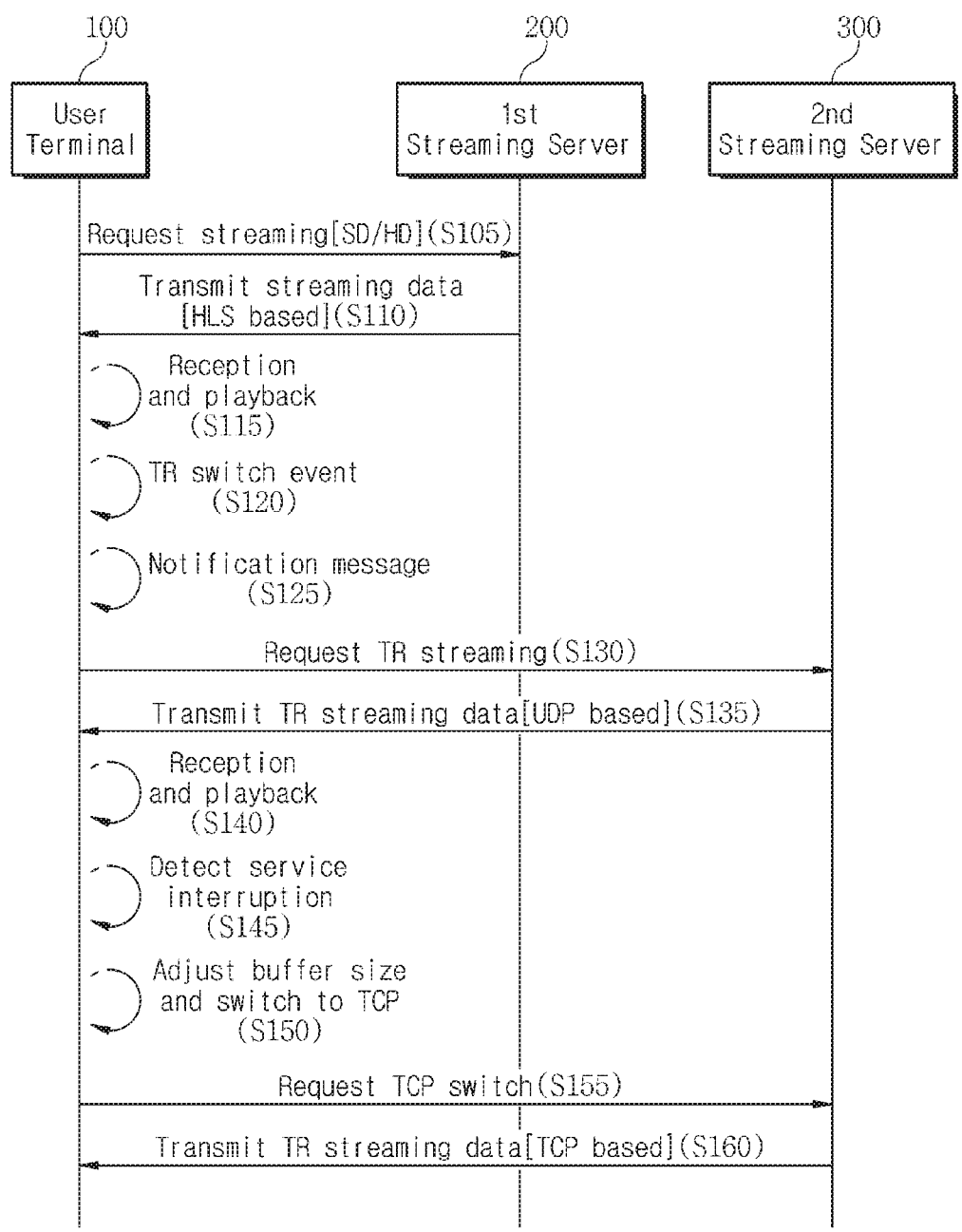
FIG. 2 is a flow diagram illustrating an operation of a system for providing low-latency real-time broadcast content according to a first embodiment of the disclosure.

FIG. 2 is a flow diagram illustrating an operation of a system for providing low-latency real-time broadcast content according to a first embodiment of the disclosure.

Now, the operation of the system for providing low-latency real-time broadcast content according to the first embodiment will be sequentially described with reference to FIG. 2.

At step S105, the user terminal 100 may transmit a streaming request for an arbitrary real-time broadcast channel to the first streaming server 200. This arbitrary real-time broadcast channel may mean a live channel other than a specific channel predetermined as a low-latency real-time broadcast channel. In this case, it may be assumed that the operation mode of the user terminal 100 is set to the first mode as default or a certain normal live channel other than the predetermined specific channel is set as default. Therefore, when initially operated, the user terminal 100 transmits a streaming request to the first streaming server 200 with respect to the real-time broadcast channel set as default.

At step S110, the first streaming server 200 transmits a streaming data packet of MPEG-TS format to the user terminal 100, based on HLS protocol. In this case, the streaming data packet may support a resolution of standard definition (SD) or high definition (HD).

At step S115, the user terminal 100 receives, decodes and plays the streaming data packet provided from the first streaming server 200. Thus, a user can view real-time broadcast content displayed on the screen.

While the streaming data packet is received from the first streaming server 200 and played back, the user terminal 100 may continuously check at step S120 whether an event of switching to the second mode (i.e., a low-latency real-time broadcast mode) occurs. Specifically, the user terminal 100 checks whether a predetermined mode switching button is input or a channel switch to a specific channel predetermined for the low-latency real-time broadcast mode is requested.

If any event of switching to the low-latency real-time broadcast mode occurs, the user terminal 100 outputs at step S125 a notification message to inform a mode switch to the low-latency real-time broadcast mode. Alternatively, another notification message to inform a failure in service may be output depending on a network status.

Thereafter, at step S130, the user terminal 100 transmits a streaming request to the second streaming server 300. Here, the channel to be requested for streaming may be a currently playing channel (or program) if the mode switching button is input, or a specific channel if a channel switch to the specific channel is requested.

The second streaming server 300 divides multimedia data of real-time broadcast content requested by the user terminal 100 into a plurality of fragments based on the MMT technology, encapsulates the fragments into one or more MPUs having metadata, constructs a streaming data packet by adding a header, and transmits the streaming data packet to the user terminal 100 at step S135. At this time, the streaming data packet may be transmitted, based on UDP.

At step S140, the user terminal 100 decapsulates and decodes the received streaming data packet, based on the MMT technology, and plays the decoded streaming data on the screen. The process of step S140 may be performed independently in the unit of MPU, and the playback may be carried out in the designated time and space based on the metadata included in each MPU of the user terminal 100, thus minimizing a delay.

In addition, at step S145, the user terminal 100 continuously detects whether the service is interrupted during playback of low-latency real-time broadcast content in the second mode. The service interruption may be determined by detecting the status of a buffer in which the user terminal 100 stores the received streaming data packet. Namely, if the amount of buffered data falls below a certain threshold value, the user terminal 100 may predict that the service interruption occurs.

If the service interruption is detected, the user terminal 100 switches the transport layer protocol to TCP while increasing the size of the buffer at step S150.

In addition, in order to transmit and receive a TCP-based packet, the user terminal 100 may establish a connection with the second streaming server 300 by requesting the second streaming server 300 to switch to TCP at step S155.

Then, at step S160, the second streaming server 300 transmits the streaming data packet, based on TCP.

Here, UDP is a connectionless protocol and has no process of establishing a session between a source and a destination for data transmission. As a best effort scheme, UDP does not perform retransmission for real-time data delivery when any error or loss occurs. Therefore, UDP having lower reliability and higher speed is suitable for cases where the real time property is required. On the other hand, TCP is a connection-oriented protocol and has a process of transmitting data after establishing a session from a source to a destination. In comparison with UDP, TCP may transmit data more securely and have a greater overhead.

Considering such differences, the disclosure basically transmits a streaming data packet based on the UDP scheme at a high speed while a service is stably performed. However, if a service interruption is detected or predicted, the disclosure switches to the TCP scheme so as to maintain a stable service.

Namely, the disclosure can transmit the streaming data packet more reliably by selectively switching to the TCP scheme.

Next, with reference to FIGS. 3 and 4, the configuration and operation of a system for providing low-latency real-time broadcast content according to the second embodiment of the disclosure will be described.

Figure 3:
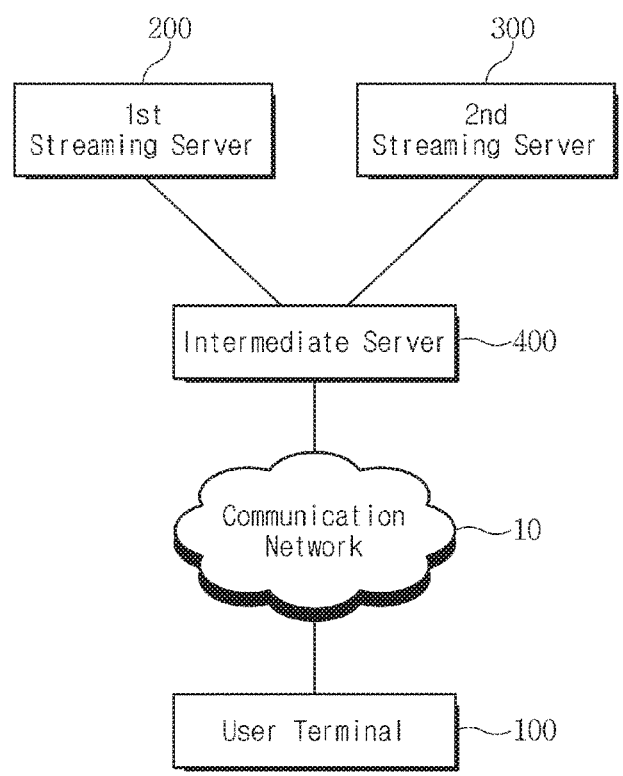
FIG. 3 is a diagram illustrating a system for providing low-latency real-time broadcast content according to a second embodiment of the disclosure.

FIG. 3 is a diagram illustrating a system for providing low-latency real-time broadcast content according to a second embodiment of the disclosure.

The system according to the second embodiment further includes an intermediate server 400 in addition to the user terminal 100 and the first and second streaming servers 200 and 300.

The user terminal 100 according to the second embodiment may access the intermediate server 400 and be connected to the first or second streaming server 200 or 300 through the intermediate server 400. Specifically, the user terminal 100 may perform a streaming request by accessing the intermediate server 400 and checks whether an event condition for switching to the low-latency real-time broadcast mode (i.e. the second mode) is satisfied. If the event condition is satisfied, the user terminal may also transmit information for requesting the low-latency real-time broadcast mode. This information may be represented as a value of a specific field in a header of a streaming request message or as channel information.

The intermediate server 400 that receives the streaming request of the user terminal 100 analyzes the streaming request to determine whether the low-latency real-time broadcast mode or not, and transmits the streaming request to the first streaming server 200 or the second streaming server 300, depending on a determination result. For example, if the streaming request is for a predetermined channel, or if information on the low-latency real-time broadcast mode is recorded in a specific field in a header of a streaming request message, the intermediate server 400 delivers the streaming request to the second streaming server 300. In other cases, the intermediate server 400 delivers the streaming request to the first streaming server 200.

The operations of the first and second streaming servers 200 and 300 differ from those in the first embodiment only in that the streaming data packet is transmitted to the user terminal 100 via the intermediate server 400.

Figure 4:
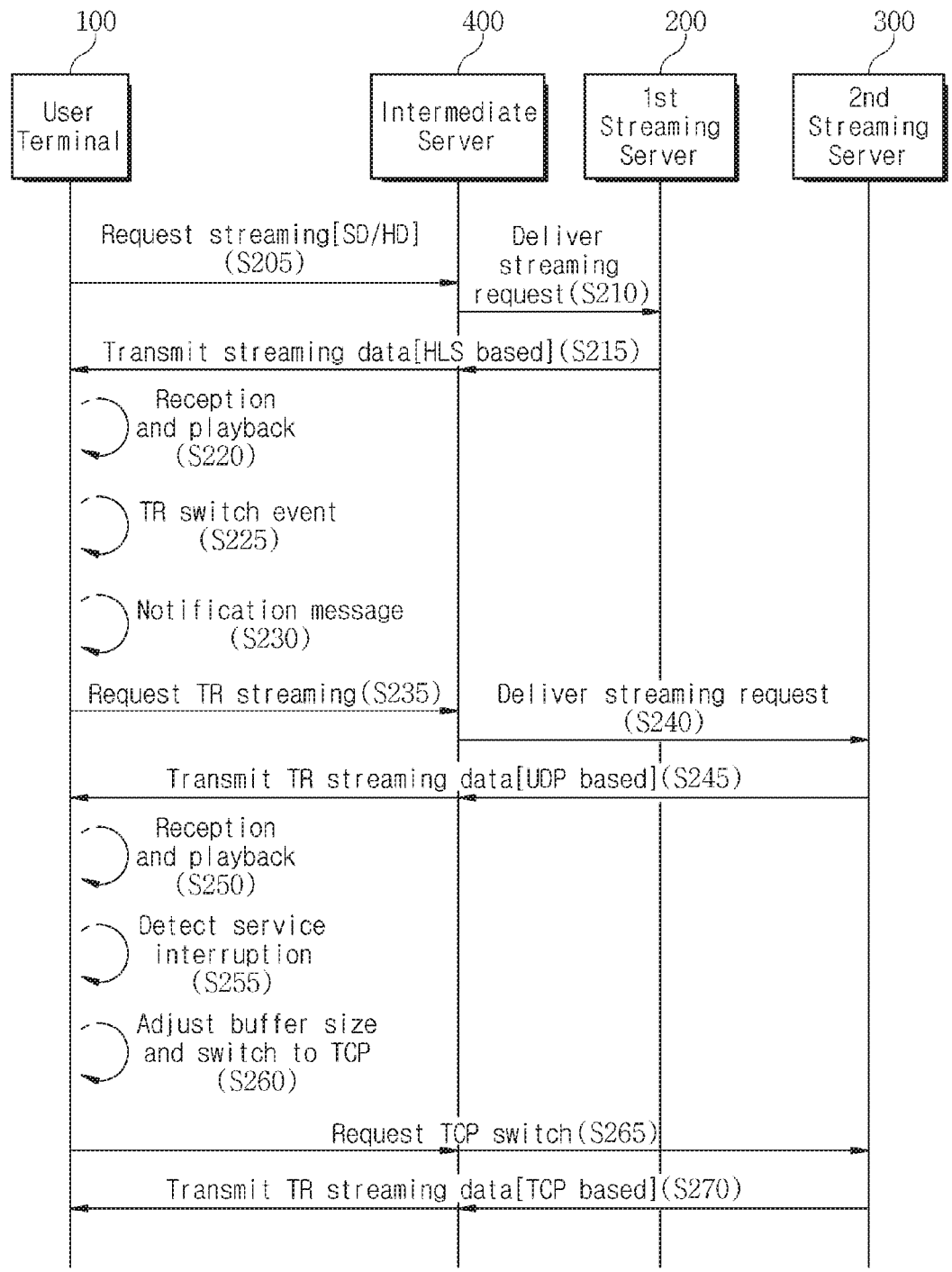
FIG. 4 is a flow diagram illustrating an operation of a system for providing low-latency real-time broadcast content according to a second embodiment of the disclosure.

FIG. 4 is a flow diagram illustrating an operation of a system for providing low-latency real-time broadcast content according to a second embodiment of the disclosure. Now, a process of providing low-latency real-time broadcast content according to the second embodiment will be described with reference to FIG. 4.

As in the first embodiment, the user terminal 100 may transmit a streaming request for a certain real-time broadcast channel. However, in the second embodiment, the streaming request of the user terminal 100 is transmitted to the intermediate server 400 at step S205. Further, in the second embodiment, the streaming request includes information indicating whether to switch to the second mode (i.e., the low-latency real-time broadcast mode). For example, this information may be recorded in a specific field of a header, or may be replaced with live channel (or program) information.

At step S205, it is assumed that there is no request for a switch to the low-latency real-time broadcast mode, or that the certain real-time broadcast is a normal live channel excluding a specific channel predetermined as a low-latency real-time broadcast channel.

In this case, the intermediate server 400 that receives the streaming request of the user terminal 100 determines whether the first mode or the second mode (i.e., the low-latency real-time broadcast mode), based on information included in the received streaming request. Specifically, if any information for requesting a switch to the low-latency real-time broadcast mode is included, or if a requested real-time broadcast channel is a specific channel predetermined as a low-latency real-time broadcast channel, the intermediate server 400 determines that a current mode is the second mode.

Therefore, the intermediate server 400 determines that the streaming request of step S205 is a streaming request in the first mode and transmits the streaming request to the first streaming server 200 at step S210.

Then, at step S215, the first streaming server 200 transmits a streaming data packet of MPEG-TS format to the user terminal 100, based on HLS protocol. In this case, the streaming data packet may support a resolution of standard definition (SD) or high definition (HD).

Thereafter, steps S220 to S230 are performed in the same manner as steps S115 to S125 of the first embodiment shown in FIG. 2.

In addition, if any event for requesting a switch to the second mode (i.e., the low-latency real-time broadcast mode) occurs, the user terminal 100 transmits a streaming request to the intermediate server 400 at step S235. The streaming request includes information for requesting a switch to the second mode (i.e., the low-latency real-time broadcast mode) or channel information about a specific channel predetermined for the low-latency real-time broadcast mode.

Therefore, at step S240, the intermediate server 400 analyzes the received streaming request and delivers the streaming request to the second streaming server 300 because of the second mode (i.e., the low-latency real-time broadcast mode).

Then, at step S245, the second streaming server 300 creates a streaming data packet, based on the MMT technology, from multimedia data of real-time broadcast content requested by the user terminal 100, and transmits the streaming data packet to the user terminal 100 through the intermediate server 400. At this time, the streaming data packet may be transmitted, based on UDP.

Thereafter, steps S250 through S270 are performed in the same manner as steps S140 through S160 of the first embodiment (FIG. 2), except that steps S265 and S270 are performed via the intermediate server 400.

According to the second embodiment, since the user terminal 100 performs communication only with the intermediate server 400, the operation of the user terminal 100 may be more simplified.

Hereinafter, a configuration and operation of an apparatus for providing low-latency real-time broadcast content according to the disclosure will be described.

The apparatus for providing low-latency real-time broadcast content according to the disclosure may be equipped in the user terminal 100 and may operate based on a computing environment of the user terminal 100.

Figure 5:
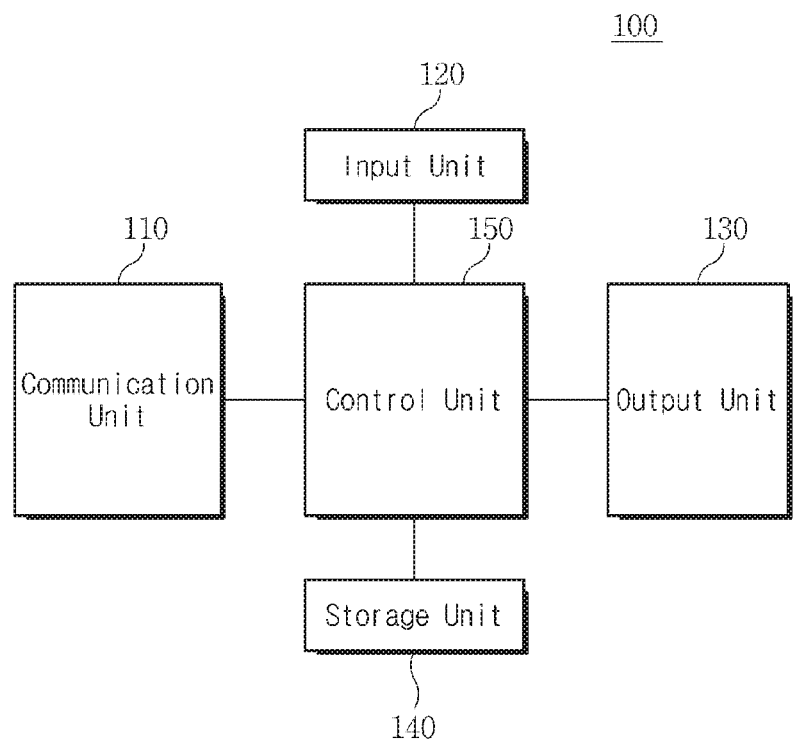
FIG. 5 is a block diagram illustrating a user terminal for providing low-latency real-time broadcast content according to an embodiment of the disclosure.

The user terminal 100 to which the disclosure is applied includes a communication unit 110, an input unit 120, an output unit 130, a storage unit 140, and a control unit 150, as shown in FIG. 5.

The communication unit 110 is configured to transmit and receive data to and from an external device such as the first and second streaming servers 200 and 300 or the intermediate server 400 through the communication network 10.

Therefore, the communication unit 110 may process data through various communication schemes as well as a wired or wireless scheme, depending on the type of the communication network 10. For this, the communication unit 110 may include a plurality of communication modules for transmitting and receiving data according to different communication schemes, respectively.

The input unit 120 is a means for inputting a user command or data. The input unit 120 creates various input data including numbers, characters, and symbols by user's manipulations and transmits the input data to the control unit 150. Also, the input unit 120 delivers commands related to setting and controlling functions of the user terminal 100 to the control unit 150. The input unit 120 may include at least one of a keypad and a touchpad which create input signals according to user's manipulations. The input unit 120 may be implemented as an input device such as a keyboard, a keypad, a mouse, a joystick, and the like or any type of input device that can be developed. In the disclosure, the user may manipulate input unit 120 to input a streaming request or request a channel switch or the like.

The output unit 130 is a means for outputting information created according to the operation of the user terminal 100 so that the user can recognize the information through visual, auditory, or tactile sense. The output unit 130 may include a display device for outputting visual information, an audio device (e.g., speaker) for outputting auditory information, a haptic device for outputting tactile information, and the like. The display device may be a touch screen. If the display device is formed in the form of the touch screen, the display device may perform some or all of functions of the input device 120. The audio device may be a speaker typically. In particular, the output unit 130 according to an embodiment may output a playback screen and sound of real-time broadcast content. In this case, the output unit 130 may further output a mode switching button for requesting a switch to the low-latency real-time broadcast mode on a user interface screen including the playback screen.

The storage unit 140 is configured to store programs and data necessary for the operation of the user terminal 100. The storage unit 140 basically stores an operating system (OS) of the user terminal 100 and may also store various applications running in the OS environment and data required for or created in the execution of such applications. The storage unit 140 may include magnetic media such as a hard disk, a floppy disk, and a magnetic tape, optical media such as a compact disc read only memory (CD-ROM) and a digital versatile disc (DVD), magneto-optical media such as a floptical disk, and semiconductor memories such as a read only memory (ROM), a random access memory (RAM), and a flash memory. In particular, the storage unit 140 stores a program module implemented to execute a function according to an embodiment of the disclosure.

Finally, the control unit 150 is configured to control the overall operation of the user terminal 100, and may include a processor such as a microprocessor, a CPU, or the like. When the power is turned on, the control unit 150 executes an OS program stored in the storage unit 140 to establish an execution environment. Based on this, one or more applications or programs are executed in response to a user command delivered from the input unit 120 so that a predetermined function or service can be provided to the user. In particular, the control unit 150 of the user terminal 100 performs particular functions of the disclosure by executing one or more program modules implemented to perform such functions and stored in the storage unit 140.

Figure 6:
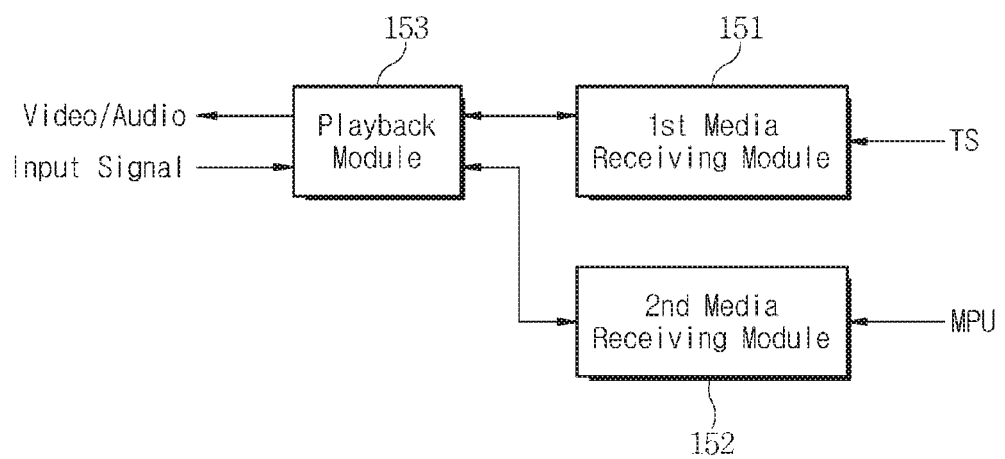
FIG. 6 is a block diagram illustrating an apparatus for providing low-latency real-time broadcast content and applied to a user terminal according to an embodiment of the disclosure.

FIG. 6 is a block diagram illustrating an apparatus for providing low-latency real-time broadcast content and applied to a user terminal according to an embodiment of the disclosure.

Referring to FIG. 6, the apparatus for providing low-latency real-time broadcast content according to an embodiment of the disclosure includes a first media receiving module 151, a second media receiving module 152, and a playback module 153. Here, the term 'module' refers to a component that performs a predetermined function, and may be implemented by hardware, software, or a combination thereof. For example, the module may refer to a program module, which is executed by a processor, i.e., the control unit 150, to perform a predetermined function.

A computer program (also known as a program, software, software application, script, or code) that is mounted in the device according to the disclosure and executes the method according to the disclosure may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one or more computer processors located locally at one site or distributed across multiple remote sites and interconnected by a communication network. Namely, in an embodiment of the disclosure, program modules may be distributed to and executed in the user terminal 100, the first and second streaming servers 200 and 300, and the intermediate server 400.

The first media receiving module 151 is configured to process a streaming data packet, based on a first media transmission technique. In an embodiment of the disclosure, the first media transmission technique is HLS. Therefore, the first media receiving module 151 receives the streaming data packet of multimedia data of real-time broadcast content transmitted from the first streaming server 200, and reconstructs the multimedia data by analyzing and decoding MPEG-2 transport stream (TS) delivered through the received streaming data packet.

At this time, the first media receiving module 151 receives file information, called m3u8, transmitted from the first streaming server 200 and, based on this, sequentially receives the TS from the first streaming server 200 to perform the above-described processing.

The second media receiving module 152 is configured to process a streaming data packet, based on a second media transmission technique. In an embodiment of the disclosure, the second media transmission technique is MMT proposed as the first part of MPEG-H.

Namely, the second media receiving module 152 receives the streaming data packet transmitted from the second streaming server 300, extracts an MPU from a payload by analyzing a header of the streaming data packet, and decodes the transmitted multimedia data with reference to metadata included in the MPU.

Figure 9:
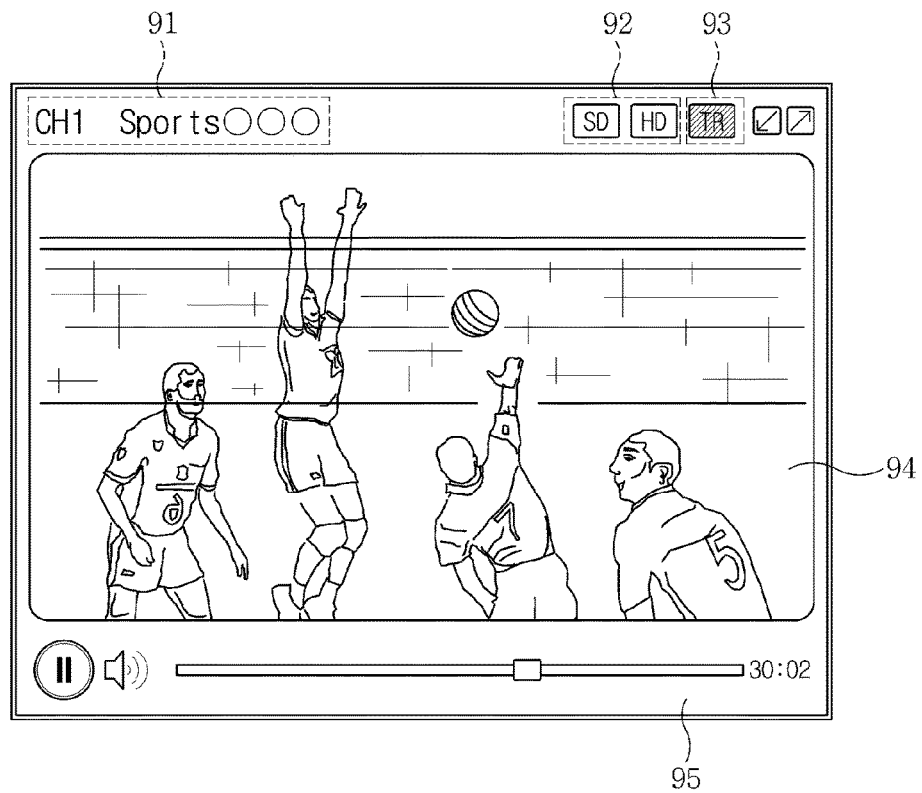
FIG. 9 is an exemplary diagram illustrating a user interface screen provided by an apparatus for providing low-latency real-time broadcast content according to an embodiment of the disclosure.

The playback module 153 is configured to operate in response to an input signal received from the input unit 120 and to play multimedia data received from the first media receiving module 151 or the second media receiving module 153. Here, playback means that the multimedia data is arranged temporally and spatially and output as visual and/or auditory information. In this case, the playback module 153 may provide a user interface as shown in FIG. 9 in connection with the use of the multimedia content, and may also control an operation such as play, pause or stop of the multimedia data in response to an input signal received through the user interface.

If a streaming request occurs through the user interface, the playback module 153 determines whether the streaming request satisfies an event condition for switching to the low-latency real-time broadcast mode. Then, depending on a determination result, the playback module 153 instructs the first or second media receiving module 151 or 152 to send the streaming request.

For example, when a mode switching button 93 for requesting a switch to the second mode (i.e., the low-latency real-time broadcast mode) is selected on the user interface, the playback module 153 determines that an event for switching to the low-latency real-time broadcast mode occurs, and then instructs the streaming request for a corresponding channel to the second media receiving module 152. If the mode switching button 93 is not selected, the playback module 153 instructs the streaming request to the first media receiving module 151. Meanwhile, in the user interfaces shown in FIG. 9, a button 92 is for selecting or displaying the first mode.

In response to the instruction of the playback module 153, the first or second media receiving module 151 or 152 transmits the streaming request to the first or second streaming server 200 or 300 directly or via the intermediate server 400. Then the first or second media receiving module 151 or 152 receives a streaming data packet from the first or second streaming server 200 or 300, based on each media transmission technique.

In addition, the first or second media receiving module 151 or 152 may transmit the streaming request to the communication network 10 through the communication unit 110 of the user terminal 100 and also receive the corresponding streaming data packet.

Now, the operation of the aforesaid apparatus for providing low-latency real-time broadcast content will be described with reference to FIG. 7.

Figure 7:
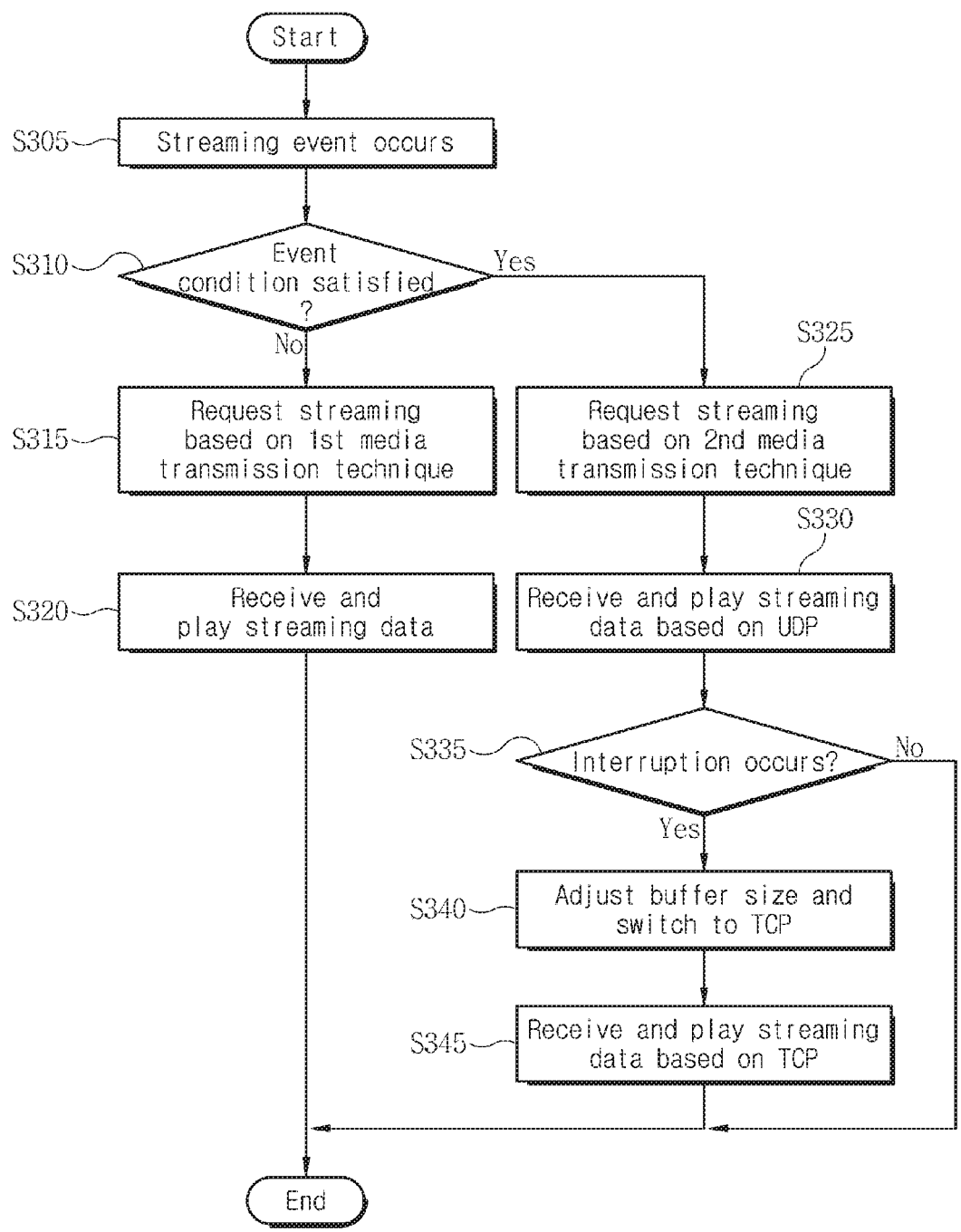
FIG. 7 is a flow diagram illustrating an operation of an apparatus for providing low-latency real-time broadcast content according to an embodiment of the disclosure.

Referring to FIG. 7, at step S305, the playback module 153 of the apparatus for providing low-latency real-time broadcast content provides a user interface for playback of multimedia data and checks whether a streaming request event occurs through the user interface. In this case, the streaming request event may occur when the playback module 153 initially operates to receive and play multimedia data of a default channel or the previously used channel, when the user selects an arbitrary channel to request a channel switch, or when the mode switching button 93 is selected as shown in FIG. 9.

When the streaming request event occurs as above, the playback module 153 determines at step S310 whether an event condition for switching to the second mode (i.e., the low-latency real-time broadcast mode) is satisfied. This event condition may be satisfied when the switching button 93 for instructing a switch to the low-latency real-time broadcast mode is selected through the user interface or when a streaming-requested channel is a specific channel predetermined for the low-latency real-time broadcast mode.

If it is determined that the event condition is not satisfied, the playback module 153 requests, at step S315, streaming of the corresponding channel to the first media receiving module 151. Then the first media receiving module 151 sends the streaming request to the first streaming server 200 directly or through the intermediate server 400. Thereafter, at step S320, the playback module 153 receives and plays a streaming data packet transmitted by the first streaming server 200. At this time, the streaming data packet received by the first media receiving module 151 includes the MPEG-TS based on the HLS as indicated by a reference symbol 'A' in FIG. 8.

If it is determined that the event condition is satisfied, the playback module 153 requests, at step S325, streaming of the corresponding channel to the second media receiving module 152. Then the second media receiving module 152 sends the streaming request to the second streaming server 300 directly or through the intermediate server 400. Thereafter, at step S330, the playback module 153 receives and plays a streaming data packet transmitted by the second streaming server 300. At this time, the streaming data packet received by the second media receiving module 152 includes the MPU based on the MMT as indicated by a reference symbol 'B' in FIG. 8. Here, the reception of the streaming data packet from the second streaming server 300 is performed, based on the UDP.

In addition, the above apparatus according to an embodiment of the disclosure checks at step S335 whether any interruption occurs by checking a buffer status while the streaming data packet is received from the second streaming server 300. If it is predicted or detected that any interruption occurs, the apparatus adjusts a buffer size and performs a switch to TCP at step S340. This step may be performed by the second media receiving module 152. Namely, the second media receiving module 152 continuously checks a buffer status to determine whether an interruption occurs. Then, if an interruption is predicted or detected, the second media receiving module 152 increases the size of a buffer for storing the streaming data packet and switches the transport layer protocol for receiving the streaming data packet to the TCP. This switch to the TCP may be performed by interworking with the second streaming server 300 through the communication unit 110 of the user terminal 100. Namely, a TCP connection with the second streaming server 300 is established through the communication unit 110.

Thereafter, at step S345, the second media receiving module 152 receives and decodes the streaming data packet from the second streaming server 300 on the basis of the TCP, and the obtained multimedia data is played through the playback module 153.

Figure 8:
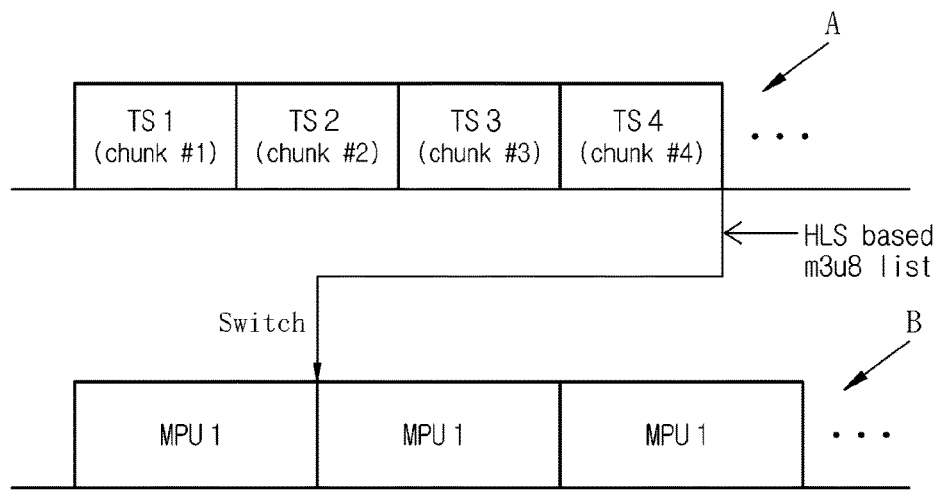
FIG. 8 is a timing diagram illustrating a steaming data packet provided to a user terminal according to an embodiment of the disclosure.

Namely, when the user presses the mode switching button 93 or requests a switch to a specific channel predetermined for the low-latency real-time broadcast mode while HLS/MPEG-TS based multimedia data is received and played as indicated by a reference symbol 'A' in FIG. 8, the apparatus according to an embodiment of the disclosure may perform a mode switch at a time point of receiving a list of m3u8 of the HLS and then, as indicated by a reference symbol 'B' in FIG. 8, receive and play MPUs from the corresponding time point.

Hereinbefore, while the disclosure has been particularly shown and described with reference to exemplary embodiments thereof, it is evident that many alternatives, modifications and variations will be apparent to and can be readily made by those skilled in the art without departing from the scope of the disclosure as defined in the appended claims. Furthermore, although specific terms have been used in the disclosure, they are used in a generic sense only to facilitate the description of the disclosure and to facilitate understanding of the disclosure, and are not intended to limit the scope of the disclosure.

Although this description and drawings illustrate exemplary device elements, the subject matters and functional operations disclosed herein may be implemented by different type digital electronic circuits or implemented by computer software, firmware or hardware including a structure disclosed herein and structural equivalent thereof, or any combination thereof. The subject matters disclosed herein may be implemented by at least one computer program product, namely at least one module regarding computer program commands encoded on a program storage medium so as to control the operation of a device according to the disclosure or allow execution thereby. A non-transitory computer-readable medium may be a machine-readable storage device, a machine-readable storage board, a memory device, a machine-readable composition of material affecting wave-type signaling, or a combination thereof.

While the disclosure contains many specific implementation details, these should not be construed as limitations on the scope of the disclosure or of what may be claimed, but rather as descriptions of features that may be specific to particular embodiments of particular disclosure. Certain features that are described in the disclosure in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Although operations are illustrated as being performed in a predetermined order in the drawings, it should not be construed that the operations are required to be performed sequentially or in the predetermined order, which is illustrated to obtain a preferable result, or that all of the illustrated operations are required to be performed. In some cases, multi-tasking and parallel processing may be advantageous. Also, it should not be construed that the division of various system components are required in all types of implementation. It should be understood that the described program components and systems are generally integrated as a single software product or packaged into a multiple-software product.

The disclosure has described specific embodiments of the disclosure. Other embodiments are within the scope of the following claims. For example, the operations recited in the claims may be performed in a different order and still achieve desirable results. By way of example, the process illustrated in the accompanying drawings does not necessarily require that particular illustrated sequence or sequential order to obtain desired results. In certain implementations, multitasking and parallel processing may be advantageous.

The description sets forth the best mode of the disclosure, and is provided to illustrate the disclosure and to enable those skilled in the art to make and use the disclosure. The written description is not intended to limit the disclosure to the specific terminology presented. Therefore, while the disclosure has been described in detail with reference to the above examples, those skilled in the art will be able to make adaptations, modifications, and variations on these examples without departing from the scope of the disclosure.

Accordingly, the scope of the disclosure should not be limited by the described embodiments but should be defined by the appended claims.

What is claimed is:

1. An apparatus for providing low-latency real-time broadcast content, the apparatus comprising:
   a first media receiving circuit, implemented by a microprocessor, configured to receive and decode a first streaming data packet of real-time broadcast content from a first streaming server for providing a streaming service based on a first media transmission technique;
   a second media receiving circuit, implemented by a microprocessor, configured to receive and decode a second streaming data packet of the real-time broadcast content from a second streaming server for providing the streaming service based on a second media transmission technique which is different from the first media transmission technique; and
   a playback circuit, implemented by a microprocessor, configured to provide a user interface for playback of the real-time broadcast content, to determine whether a streaming request event satisfies an event condition for switching to a low-latency real-time broadcast mode when the streaming request event for an arbitrary channel occurs through the user interface, to instruct a streaming request to the first or second media receiving circuit depending on a determination result, and to play the decoded first or second streaming data packet received from the first or second media receiving circuit, wherein the second media receiving circuit is further configured to switch a transport layer protocol to a transmission control protocol (TCP) so as to receive the second streaming data packet if an interruption is detected or predicted while the second streaming data packet is received based on a user datagram protocol (UDP).

2. The apparatus of claim 1, wherein the playback circuit is further configured to determine that event condition is satisfied when a mode switching button for instructing a switch to the low-latency real-time broadcast mode is selected through the user interface or when the arbitrary channel is a specific channel predetermined for the low-latency real-time broadcast mode.

3. The apparatus of claim 1, wherein the second media receiving circuit is further configured to check a buffer status by detecting or predicting an interruption while receiving the second streaming data packet from the second streaming server, and to adjust a buffer size when the interruption is detected or predicted.

4. A non-transitory computer-readable recording medium having a program recorded therein for providing low-latency real-time broadcast content, the program, executed by a microprocessor including electronic circuits, comprising steps of:
  determining whether a streaming request event satisfies an event condition for switching to a low-latency real-time broadcast mode when the streaming request event for an arbitrary channel occurs;
  if the event condition is not satisfied, transmitting a streaming request to a first streaming server for providing a streaming service based on a first media transmission technique and then receiving and decoding a first streaming data packet of real-time broadcast content from the first streaming server;
  if the event condition is satisfied, transmitting the streaming request to a second streaming server for providing the streaming service based on a second media transmission technique different from the first media transmission technique and then receiving and decoding a second streaming data packet of the real-time broadcast content from the second streaming server; and
  playing the decoded first or second streaming data packet,
  wherein the program further comprises steps of:
  if the interruption is detected or predicted, switching a transport layer protocol of the second streaming data packet from a user datagram protocol (UDP) to a transmission control protocol (TCP).

5. The non-transitory computer-readable recording medium of claim 4, wherein the determining step includes determining that event condition is satisfied when a mode switching button for instructing a switch to the low-latency real-time broadcast mode is selected or when the arbitrary channel is a specific channel predetermined for the low-latency real-time broadcast mode.

6. The non-transitory computer-readable recording medium of claim 4, further comprising steps of:
  checking a buffer status by detecting or predicting an interruption while receiving the second streaming data packet from the second streaming server; and
  if the interruption is detected or predicted, adjusting a size of a buffer for storing the second streaming data packet received from the second streaming server.

* * * * *